US010200999B2

(12) United States Patent
Rahmati et al.

(10) Patent No.: US 10,200,999 B2
(45) Date of Patent: Feb. 5, 2019

(54) METHOD AND APPARATUS FOR BLIND DETECTION OF INTERFERENCE PARAMETERS IN LTE SYSTEM

(71) Applicant: Samsung Electronics Co., Ltd., Gyeonggi-do (KR)

(72) Inventors: Mojtaba Rahmati, San Diego, CA (US); Dongwoon Bai, San Diego, CA (US); Jungwon Lee, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 99 days.

(21) Appl. No.: 15/144,398

(22) Filed: May 2, 2016

(65) Prior Publication Data
US 2017/0245286 A1 Aug. 24, 2017

Related U.S. Application Data

(60) Provisional application No. 62/296,804, filed on Feb. 18, 2016.

(51) Int. Cl.
*H04L 5/00* (2006.01)
*H04J 11/00* (2006.01)
(Continued)

(52) U.S. Cl.
CPC ......... *H04W 72/082* (2013.01); *H04J 11/005* (2013.01); *H04L 1/0054* (2013.01);
(Continued)

(58) Field of Classification Search
CPC .... H04W 72/082; H04W 72/06; H04L 5/005; H04L 5/0026; H04L 1/0054
See application file for complete search history.

(56) References Cited

U.S. PATENT DOCUMENTS 7,400,607 B2 7/2008 Kim et al.
7,995,641 B2 8/2011 Bottomley et al.
(Continued)

FOREIGN PATENT DOCUMENTS

WO WO 2014/071210 5/2014

OTHER PUBLICATIONS

Heunchul Lee et al., Interference cancellation based on blindly-detected interference parameters for LTE-advanced UE, IEEE ICC 2015, Mobile and Wireless Networking Symposium.
(Continued)

*Primary Examiner* — Rasheed Gidado
(74) *Attorney, Agent, or Firm* — The Farrell Law Firm, P.C.

(57) ABSTRACT

A method and an apparatus. The method includes receiving a signal including a serving signal and an interference signal; applying a Gaussian approximation (GA) on the serving signal and the interference signal; determining, jointly, a maximum likelihood (ML) solution of rank, traffic to pilot ratio (TPR), and precoding matrix index on the GA-applied serving signal and the GA-applied interference signal. The apparatus includes an antenna for receiving a signal including a serving signal and an interference signal; a processor configured to apply a GA on the serving signal and the interference signal, and determine, jointly, an ML solution of rank, TPR, and precoding matrix index on the GA-applied serving signal and the GA-applied interference signal.

10 Claims, 2 Drawing Sheets

(51) Int. Cl.
*H04L 1/00* (2006.01)
*H04W 72/08* (2009.01)
*H04W 72/06* (2009.01)

(52) U.S. Cl.
CPC ............ *H04L 5/005* (2013.01); *H04L 5/0026* (2013.01); *H04W 72/06* (2013.01)

(56) References Cited

U.S. PATENT DOCUMENTS

| | | | |
|---|---|---|---|
| 8,259,843 B2* | 9/2012 | Cai | H03F 1/3294 |
| | | | 375/295 |
| 8,583,051 B2* | 11/2013 | Lee | H04B 17/345 |
| | | | 370/315 |
| 8,724,741 B2 | 5/2014 | Bottomley et al. | |
| 8,908,743 B2 | 12/2014 | Badic et al. | |
| 9,036,681 B2 | 5/2015 | Christensen | |
| 9,203,659 B2 | 12/2015 | Choi et al. | |
| 9,564,955 B2* | 2/2017 | Lee | H04W 76/046 |
| 9,699,048 B2* | 7/2017 | Sanayei | H04L 43/08 |
| 2007/0147329 A1 | 6/2007 | Soriaga et al. | |
| 2012/0201152 A1* | 8/2012 | Yoo | H04B 17/345 |
| | | | 370/252 |
| 2013/0114437 A1 | 5/2013 | Yoo et al. | |
| 2013/0301587 A1 | 11/2013 | Luo et al. | |
| 2013/0336249 A1 | 12/2013 | Zhao et al. | |
| 2014/0036801 A1 | 2/2014 | Malladi et al. | |
| 2014/0301251 A1 | 10/2014 | Chen et al. | |
| 2014/0301309 A1 | 10/2014 | Luo et al. | |
| 2014/0302863 A1 | 10/2014 | Chen et al. | |
| 2014/0334434 A1 | 11/2014 | Bhattad et al. | |
| 2014/0362954 A1* | 12/2014 | Choi | H04L 25/067 |
| | | | 375/341 |
| 2015/0098421 A1 | 4/2015 | Barbieri et al. | |
| 2015/0131573 A1 | 5/2015 | Yoo et al. | |
| 2015/0270917 A1 | 9/2015 | Roman et al. | |
| 2015/0358089 A1 | 12/2015 | Beckman et al. | |
| 2016/0036547 A1* | 2/2016 | Lee | H04B 7/0486 |
| | | | 370/329 |
| 2016/0219599 A1* | 7/2016 | Lee | H04B 7/0486 |

OTHER PUBLICATIONS

Mobile and Wireless Networking Symposium, Jun. 8-12, 2015.
Y.H.Zhang et al., Low Complexity Joint Semiblind Detection for OFDM Systems over Time-Varying Channels.
Wireless Communications and Networking Conference, 2008. WCNC 2008. IEEE Year: Mar. 31-Apr. 3, 2008.

* cited by examiner

METHOD AND APPARATUS FOR BLIND DETECTION OF INTERFERENCE PARAMETERS IN LTE SYSTEM

PRIORITY

This application claims priority under 35 U.S.C. § 119(e) to a U.S. Provisional Patent Application filed on Feb. 18, 2016 in the United States Patent and Trademark Office and assigned Ser. No. 62/296,804, the entire contents of which are incorporated herein by reference.

FIELD

The present disclosure relates generally to telecommunications, and more particularly, to a method and an apparatus for blind detection of interference patterns in a long term evolution (LTE) system.

BACKGROUND

Network assisted interference cancellation and suppression (NAICS) has attracted a lot of attention in the $3^{rd}$ Generation Partnership Project (3GPP) due to its capability to increase transmission rate and is adopted as an optional feature in Release 12 of the 3GPP. In the presence of an interference signal, joint maximum-likelihood (ML) detection can provide a significant performance gain. However, to perform joint detection, interference dynamic parameters such as channel, transmission mode (TM), number of cell-specific reference signal (CRS) ports (TM1-TM7), number of demodulation reference signal (DMRS) ports (TM8-TM10), precoding power ($P_A$) and transmitted power ($P_B$) (TM1-TM7), rank indicator (RI), pre-coding matrix indicator (PMI), and modulation order must be known.

A conventional receiver considers co-channel interference as additive white Gaussian noise (AWGN). The NAICS was introduced to address the capacity and performance issues in LTE downlink channels, including the high complexity of conventional joint ML estimation of traffic to pilot ratio (TPR), rank, precoding, and modulation order. Due to the limited back-haul and control channel resources from an evolved node B (eNB) to a user equipment (UE), it is not be possible to provide a UE with information regarding all the interfering cell dynamic parameters. A portion of the dynamic parameters may be provided as side information to the UE so that other parameters are left for blind-detection by the UE.

SUMMARY

According to one embodiment, a method includes receiving a signal including a serving signal and an interference signal; applying a Gaussian approximation (GA) on the serving signal and the interference signal; determining, jointly, a maximum likelihood (ML) solution of rank, traffic to pilot ratio (TPR), and precoding matrix index on the GA-applied serving signal and the GA-applied interference signal.

According to one embodiment, an apparatus includes an antenna for receiving a signal including a serving signal and an interference signal; a processor configured to apply a GA on the serving signal and the interference signal, and determine, jointly, an ML solution of rank, TPR, and precoding matrix index on the GA-applied serving signal and the GA-applied interference signal.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

According to an embodiment of the present disclosure, blind interference parameter identification is provided which may be used in NAICS LTE scenarios to improve overall serving cell detection quality with joint detection of serving and interference signals. The present disclosure may be applied to CRS-based TMs, i.e., TM1-TM7 with two CRS antenna ports. In addition, the present disclosure may be applied to one CRS antenna port. The number of CRS antenna ports may be provided to a NAICS UE by radio resource control (RRC) signaling.

According to an embodiment of the present disclosure, a low complexity identification scheme for rank, precoding and transmitted power ($P_A$ for non-CRS OFDM symbols and $P_B$ for CRS OFDM symbols) identification is provided. The embodiment may be part of a modem to support NAICS as one of the LTE Release 12 features and support interference parameter identification. The present disclosure may provide identification of TPR, precoding index, and rank of the interference signal. TPR represents the power ratio of data symbols to pilot symbols. The present disclosure applies GA over both serving and interfering signals to simplify the identification of TPR and precoding methodology. The present disclosure may also be implemented after serving signal cancellation which is a special case of interference identification in the presence of both serving and interfering signals. GA of the interference and serving signals allows the present disclosure to detect TPR, distinguish between rank 1 and rank 2/space frequency block decoding (SFBC), detect rank 1 precoding, and provide rank 2 precoding identification to differentiate rank 2 and SFBC cases.

According to an embodiment of the present disclosure, ML identification with Gaussian approximation scheme (ML-GA) may be further approximated. This reduces the number of required divisions and logarithm calculations by a factor of K, where K is the number of resource elements (REs) used in detection. For example, only one division and one logarithm calculation may be required per resource block (RB).

In an embodiment of the present disclosure, GA reduces interference parameter complexity. In addition, joint detection of TPR, rank and precoding after GA is provided in a low complexity scheme. Furthermore, low complexity rank 2 precoding identification after rank 2 interference is determined is provided.

Figure 1:
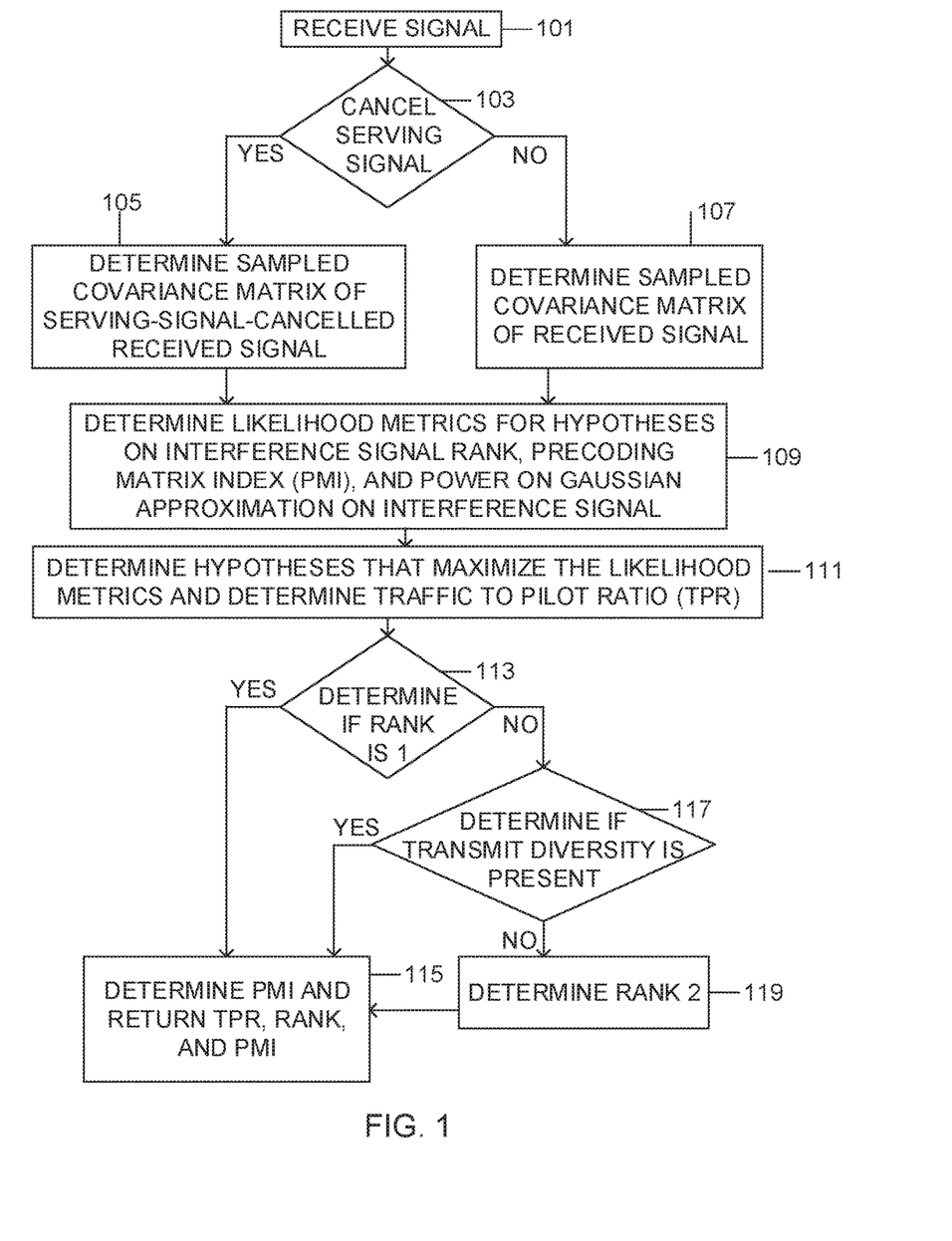
FIG. 1 is a block diagram of an apparatus, according to an embodiment of the present disclosure.

FIG. 1 is a flowchart of a method of blind detection of interference parameters, according to an embodiment of the present disclosure. In the presence of several interfering cells, an NAICS UE may determine the strongest interfering cell among RRC-signaled candidate cells based on received power observations such as received signal power (RSP). That is, the present disclosure may process a dominant interference signal.

Referring to FIG. 1, a signal is received at 101, where the signal may include a serving signal and an interference signal. According to an embodiment of the present disclosure, CRS based transmissions, i.e., TM1-TM7, may be processed. The number of CRS antenna ports may be provided to an NAICS UE by RRC signaling. In the case of one CRS antenna port, TPR and modulation order may be identified and in the case of two CRS antenna ports, TPR, rank, precoding and modulation order may be identified. Rank, precoding, and TPR identification for two CRS antenna ports may be provided. In addition, TPR identification for one CRS antenna port may be provided.

Considering only a dominant interfering UE, a received signal in the presence of a serving signal on a kth RE may be described as in Equation (1) as follows:

$$y_k = H_k^S x_k^S + \rho_I H_k^I x_k^I + n_k \qquad (1)$$

where $H_k^m$ represents an effective channel matrix from a serving eNodeB to a UE for m=S and from an interfering cell to the UE for m=I, where $\rho_I$ represents a TPR of the interfering signal, $x_k^m = [x_k^{m,1}, \ldots, x_k^{m,l_m}]^T$ is a $l_m \times 1$ transmit signal vector, $l_m$ indicates a number of transmission layers, and $n_k$ is an AWGN vector with covariance $E\{n_k n_k^H\} = \sigma^2 I$. The i-th layer's transmit symbol $x_k^{m,i}$ is chosen from some constellation $\mathbb{C}_i^m$ with cardinality of $|\mathbb{C}_i^m|$, where $|\mathbb{C}_i^S|$ is known, $|\mathbb{C}_i^I| = 2^q$ is unknown, and an NAICS UE blindly detects q. As described above, $H_k^m$ represents an effective channel matrix which may be written in terms of matrix $G_k^m$ and precoding matrix $P^S$ as $H_k^S = G_k^S P^S$ and $H_k^I = G_k^I P^{I,l_I,p}$.

An NAICS UE may estimate $G_k^S$, but $P^{I,l_I,p}$ is unknown, with p denoting an interference precoding index and $l_I$ denoting an interference rank. For rank 1, the precoding matrices are $$P^{I,1,0} = \frac{1}{\sqrt{2}}\begin{bmatrix}1\\1\end{bmatrix}, P^{I,1,1} = \frac{1}{\sqrt{2}}\begin{bmatrix}1\\-1\end{bmatrix},$$

$$P^{I,1,2} = \frac{1}{\sqrt{2}}\begin{bmatrix}1\\j\end{bmatrix}, P^{I,1,3} = \frac{1}{\sqrt{2}}\begin{bmatrix}1\\-j\end{bmatrix},$$

and for rank 2 the precoding matrices are $$P^{I,2,0} = \frac{1}{2}\begin{bmatrix}1 & 1\\1 & -1\end{bmatrix}, P^{I,2,1} = \frac{1}{2}\begin{bmatrix}1 & 1\\j & -j\end{bmatrix}.$$

According to an embodiment of the present disclosure, an NAICS UE may blindly detect an interference rank $l_I$, an interference precoding index p, and an interference TPR $\rho_I$.

At 103, the present system determines whether the serving signal in the received signal is cancelled or not.

In NAICS, if a cyclic redundancy check (CRC) of a serving signal fails, then interference parameter identification is performed to enable joint detection and improve serving signal detection performance. The decoder output is employed after serving signal decoding in interference parameter identification by soft inference cancellation. If $\hat{x}_k^S$ is defined as the soft estimation of the serving signal, after cancellation, Equation (2) is obtained as follows:

$$\hat{y}_k = y_k - H_k^S \hat{x}_k^S = \rho_I H_k^I x_k^I + H_k^S(x_k^S - \hat{x}_k^S) + n_k \qquad (2)$$

If a serving signal is cancelled from the received signal then a sampled covariance matrix of serving-signal-cancelled received signal is determined at 105.

If a serving signal is not cancelled from the received signal then a sampled covariance matrix of the received signal is determined at 107.

Furthermore, $\hat{y}_k$ may be modified to be more like white noise (e.g., whitened), where, for a covariance matrix of noise and residual signal, Equation (3) as follows:

$$\hat{R}_k = L_k L_k^H = \sigma^2 I + H_k^S E\{(x_k^S - \hat{x}_k^S)(x_k^S - \hat{x}_k^S)^H\}(H_k^S)^H \qquad (3)$$

and $E\{(x_k^S - \hat{x}_k^S)(x_k^S - \hat{x}_k^S)^H\}$ may be calculated using decoder output log-likelihood ratios (LLRs). Therefore, by applying whitening matrix $W_k = L_K^{-1}$, Equation (4) is obtained as follows:

$$y'_k = W_k \hat{y}_k = \rho_I W_k H_k^I x_k^I + n'_k \qquad (4)$$

The system model with serving signal cancellation as applied in Equation (4) above may be considered as a variation of Equation (1) above with $H_k^S=0$.

Following the model provided in Equation (1) above, with known $G_k^S$, $P^S$ and $\mathbb{C}_i^S$ for $i \in \{1, \ldots, 1_S\}$, Equation (5) is defined as follows:

$$\mathcal{M}_{\rho_I, p, l_I, q} = \prod_{k=1}^{K} \frac{1}{|X^S|} \sum_{x_k^S \in X^S} \frac{1}{|X_{l_I,q}^I|} \sum_{x_k^I \in X_{l_I,q}^I} e^{-\frac{\|y_k - G_k^S P^S x_k^S - \rho_I G_k^{I,l_I,p} x_k^I\|}{\sigma^2}} \quad (5)$$

A joint ML detection for $l_I$, $p$, $\rho_I$ and $q$ may be obtained in Equation (6) as follows:

$$(\hat{\rho}_I, \hat{p}, \hat{l}_I, \hat{q}) = \arg\max_{\rho_I, p, l_I, q} \mathcal{M}_{\rho_I, p, l_I, q} \quad (6)$$

After either 105 or 107, likelihood metrics for hypotheses on interference signal rank, precoding matrix index (PMI), and power with GA on the interference signal are determined at 109.

According to an embodiment of the present disclosure, sequential detection of different parameters is provided. Joint identification of TPR and covariance matrix index (cmi) may be a first step of the sequential detection.

According to an embodiment of the present disclosure, the present system and method applies GA over both interfering and serving signals as in Equation (7) as follows:

$$x_k^m \sim N(0, I_{l_m}) \quad (7)$$

GA may be applied after serving signal cancellation. The present disclosure provides an ML solution after GA (ML-GA), and provides a further approximation over the ML-GA solution for reducing complexity and providing a feasible solution for a hardware implementation.

At 111, hypotheses that maximize the likelihood metrics are determined and the traffic to pilot ration (TPR) is determined.

With the above GA for $R_k = E\{y_k y_k^H\}$, Equation (8) is as follows:

$$R_k = G_k^S P^S (P^S)^H (G_k^S)^H + \rho_I^2 G_k^I P^{I,l_I,p} (P^{I,l_I,p})^H (G_k^I)^H + \sigma^2 I \quad (8)$$

If $G_k^S$, $P^S$, $G_k^I$ and $\sigma^2$ are given, $R_k$ is a function of $\rho_I^2 P^{I,l_I,p} (P^{I,l_I,p})^H$. For different rank 1 precoding indices, $P^{I,1,p_1}(P^{I,1,p_1})^H \neq P^{I,1,p_2}(P^{I,1,p_2})^H$ for $p_1 \neq p_2$. For both SFBC and rank 2, $P^{I,l_I,p}(P^{I,l_I,p})^H = \frac{1}{2} I_{N_t}$.

At 113, the present system determines whether the received signal or the serving-signal-cancelled received signal is of rank 1. At 113, rank 1 and rank 2/SFBC are differentiated.

At 115, if the present system determines at 113 that the rank of the received signal or the serving-signal-cancelled received signal is rank 1, rank 1 PMI is identified and TPR, rank, and PMI are returned.

A cmi parameter may be defined where a cmi set is defined as cmi$\in\{0, 1, 2, 3, 4\}$ with cmi=i (for $i \in \{0, 1, 2, 3\}$) corresponding to rank 1 with a precoding index of p=i, and cmi=4 corresponding to rank 2 and SFBC, where SFBC may not be distinguished from rank 2, and no information may be provided regarding a rank 2 precoding index.

According to an embodiment of the present disclosure, the present system provides joint TPR and CMI detection as a first step of sequential blind detection. If cmi is identified as cmi$\neq 4$, rank and precoding are known. However, if cmi is identified as cmi=4, then SFBC and rank 2 must be differentiated.

At 117, if the present system does not determine that the rank of the received signal or the serving-signal-cancelled received signal is rank 1, the present system determines whether transmit diversity is present in the received signal or the serving-signal-cancelled received signal. That is, if transmit diversity is present then SFBC is detected. Otherwise, the rank of the received signal or the serving-signal-cancelled received signal is rank 2. In an embodiment of the present disclosure, a blind SFBC detection method may be applied to differentiate rank 2 from SFBC.

If SFBC is detected at 117, then the present system returns to determining a PMI of the received signal or the serving-signal-cancelled received signal that concerns SFBC and returning TPR, rank, and PMI at 115. If SFBC is not detected at 117, the present system determines that the rank is 2 at 119.

If rank 2 is determined at 119, then the present system returns to determining a PMI for the received signal or the serving-signal-cancelled received signal of rank 2 and returning TPR, rank, and PMI at 115.

With GA, a likelihood metric to be maximized may be as in Equation (9) as follows:

$$\mathcal{M}_{\rho_I, cmi} = \prod_{k=1}^{k} \frac{1}{|R_k(\rho_I, cmi)|} e^{-y_k^H R_k^{-1}(\rho_I, cmi) y_k}, \quad (9)$$

where $|R_k(\rho_I, cmi)|$ denotes a determinant of matrix $R_k(\rho_I, cmi)$. If Equation (10) is defined as follows:

$$M_{\rho_I, cmi} = -\log(\mathcal{M}_{\rho_I, cmi}) \quad (10)$$
$$= \sum_{k=1}^{K} y_k^H R_k^{-1}(\rho_I, cmi) y_k + \log(|R_k(\rho_I, cmi)|)$$
$$= \sum_{k=1}^{K} \text{trace } (y_k y_k^H R_k^{-1}(\rho_I, cmi)) + \log(|R_k(\rho_I, cmi)|),$$

where trace (ABC)=trace (CAB), then an ML joint identification of ($\rho_I$, cmi) is obtained as in Equation (11) as follows:

$$(\hat{\rho}_I, \widehat{cm} i) = \arg\min_{\rho_I, cmi} M_{\rho_I, cmi} \quad (11)$$

Furthermore, if Equations (12)-(15) are defined as follows:

$$R_k^S = G_k^S P^S (P^S)^H (G_k^S)^H \quad (12)$$
$$= \begin{bmatrix} r_{k,00}^S & r_{k,01}^S \\ r_{k,10}^S & r_{k,11}^S \end{bmatrix},$$

$$R_k^I(cmi) = G_k^I P^{I,l_I,p} (P^{I,l_I,p})^H (G_k^I)^H \quad (13)$$
$$= \begin{bmatrix} r_{k,00}^I(cmi) & r_{k,01}^I(cmi) \\ r_{k,10}^I(cmi) & r_{k,11}^I(cmi) \end{bmatrix},$$

$$D_k^S = \begin{bmatrix} r_{k,11}^S & -r_{k,01}^S \\ -r_{k,10}^S & r_{k,00}^S \end{bmatrix}, \text{ and} \quad (14)$$

-continued $$D_k^I(cmi) = \begin{bmatrix} r_{k,11}^I(cmi) & -r_{k,01}^I(cmi) \\ -r_{k,10}^I(cmi) & r_{k,00}^I(cmi) \end{bmatrix}, \quad (15)$$

then $R_k^{-1}(\rho_I, cmi)$ may be described as in Equation (16) as follows:

$$R_k^{-1}(\rho_I, cmi) = \frac{D_k^S + \rho_I^2 D_k^I(cmi) + \sigma^2 I}{|R_k(\rho_I, cmi)|}. \quad (16)$$

In the presence of a serving signal and using two CRS antenna ports, Equation (17) is obtained as follows:

$$M_{\rho_I,cmi} = \sum_{k=1}^{K} \frac{\text{trace }(y_k y_k^H (D_k^S + \sigma^2 I)) + \rho_I^2 \text{ trace }(y_k y_k^H D_k^I(cmi))}{|R_k(\rho_I, cmi)|} + \quad (17)$$

$$\log(|R_k(\rho_I, cmi)|)$$

If a serving signal is cancelled and two CRS antenna ports are used, Equation (18) is obtained as follows:

$$M_{\rho_I,cmi} = \sum_{k=1}^{K} \frac{\sigma'^2 \text{ trace }(y_k' y_k'^H) + \rho_I^2 \text{ trace }(y_k y_k^H D_k'^I(cmi))}{|R_k'(\rho_I, cmi)|} + \quad (18)$$

$$\log(|R_k'(\rho_I, cmi)|),$$

where $y'_k$ is given in Equation (4) above and $R'_k(\rho_I, cmi) = \rho_I^2 W_k G_k^I P^{I,l_1,p}(P^{I,l_1,p})^H (G_k^I)^H W_k^H + \sigma'^2 I$.

According to an embodiment of the present disclosure, TPR detection for one CRS antenna port is provided. For one CRS antenna port, no precoding is applied, and only $\rho_I$ may be identified. Therefore, a metric as in Equation (19) may be as follows:

$$M_{\rho_I} = \quad (19)$$

$$\sum_{k=1}^{K} \frac{\text{trace }(y_k y_k^H (D_k^S + \sigma^2 I)) + \rho_I^2 \text{ trace }(y_k y_k^H D_k^I)}{|R_k(\rho_I)|} + \log(|R_k(\rho_I)|),$$

where $D_k^I$ is known (not a function of precoding) and $\rho_I$ may be identified.

The computational complexity of $M_{\rho_I,cmi}$ in Equations (17) and (18) above, and $M_{\rho_I}$ in Equation (19) is still high since $\log(|R_k(\rho_I, cmi)|)$ must be determined, division by $|R_k(\rho_I, cmi)|$ must be performed for each RE of a given RB, for each pair of $(\rho_I, cmi)$, where $(\rho_I, cmi)$ represents one possible hypothesis. In addition, there are 15 possible hypotheses per RB (e.g., 3 possibilities for $\rho_I$ and 5 possibilities for cmi).

In an embodiment of the present disclosure, a further approximation over $M_{\rho_I,cmi}$ is provided (e.g., a further approximation over ML-GA), which reduces hardware complexity.

Due to Jensen's inequality, Equation (20) is as follows:

$$\sum_{k=1}^{K} \log(|R_k(\rho_I, cmi)|) \leq K \log\left(\frac{|R_k(\rho_I, cmi)|}{K}\right). \quad (20)$$

The inequality in Equation (20) above becomes an equality for static channels, i.e., $R_{k_1}(\rho_I, cmi) = R_{k_2}(\rho_I, cmi)$ for all $k_1$ and $k_2$. Furthermore, $$\sum_{k=1}^{K} \frac{a_k}{b_k}$$

may be approximated as in Equation (21) as follows:

$$\sum_{k=1}^{K} \frac{a_k}{b_k} \approx \frac{\sum_{k=1}^{K} a_k}{\sum_{k=1}^{K} \frac{b_k}{K}}. \quad (21)$$

The approximation in Equation (21) above becomes exact for static channel cases. By substituting Equations (20) and (21) into Equation (17), Equation (22) is obtained as follows:

$$M_{\rho_I,cmi} \approx \frac{\sum_{k=1}^{K} \text{trace }(y_k y_k^H (D_k^S + \sigma^2 I)) + \rho_I^2 \text{ trace }(y_k y_k^H D_k^I(cmi))}{\sum_{k=1}^{K} \frac{|R_k(\rho_I, cmi)|}{K}} + \quad (22)$$

$$K \log\left(\frac{\sum_{k=1}^{K} |R_k(\rho_I, cmi)|}{K}\right).$$

The above approximation reduces the required number of divisions and logarithm calculations by a factor of K, where K is a number of REs in at least one RB.

Calculation complexity may be reduced further in the calculation of $|R_k(\rho_I, cmi)|$. If $|R_k(\rho_I, cmi)|$ for each hypothesis is directly calculated, then a calculation per RE is for 15 hypotheses (e.g., 5 possibilities for cmi and 3 possibilities for $\rho_I$, where the three possible $\rho_I$ values are signaled to a UE). If $R_k^S$, and $R_k^I(cmi)$ are given, Equation (23) as follows may be determined first:

$$R_k(\rho_I, cmi) = R_k^S + \rho_I^2 R_k^I(cmi) + \sigma^2 I, \quad (23)$$

where, for each $(\rho_I, cmi)$ pair, 4 multiplications per hypothesis are required, and a total of 60 multiplications and 15 2×2 determinations are required per RE.

A lower complexity calculation of $|R_k(\rho_I, cmi)|$ is described in Equation (24) as follows:

$$|R_k(\rho_I, cmi)| = |R_k^S + \rho_I^2 R_k^I(cmi) + \sigma^2 I| \quad (24)$$

$$= |R_k^S + \sigma^2 I| + \rho_I^4 |R_k^I(cmi)| +$$

$$\rho_I^2 (|A_k(cmi)||B_k(cmi)|)$$

-continued where $$A_k(cmi) = \begin{bmatrix} r_{k,00}^S + \sigma^2 & r_{k,01}^S \\ r_{k,10}^I(cmi) & r_{k,11}^I(cmi) \end{bmatrix},$$

and where $$B_k(cmi) = \begin{bmatrix} r_{k,00}^I(cmi) & r_{k,01}^I(cmi) \\ r_{k,10}^S & r_{k,11}^S + \sigma^2 \end{bmatrix}.$$

For $cmi \in \{0, 1, 2, 3\}$, $R_k^I(cmi)$ is a rank 1 matrix, then $|R_k^I(cmi)|=0$ for $cmi \in \{0, 1, 2, 3\}$ and only $|R_k^I(cmi)|$ may be determined for $cmi=4$. Therefore, for $\Sigma_{k=1}^K |R_k(\rho_I, cmi)|$, Equation (25) is as follows:

$$\sum_{k=1}^{K} |R_k(\rho_I, cmi)| = \sum_{k=1}^{K} |R_k^S + \sigma^2 I| + \tag{25}$$

$$\begin{cases} \rho_I^2 \sum_{k=1}^{K} (|A_k(cmi)| + |B_k(cmi)|) & cmi \in \{0, 1, 2, 3\} \\ \rho_I^4 \sum_{k=1}^{K} |R_k^I(cmi)| + \rho_I^2 \sum_{k=1}^{K} (|A_k(cmi)| + |B_k(cmi)|) & cmi = 4 \end{cases}$$

To calculate $\Sigma_{k=1}^K |R_k(\rho_I, cmi)|$, 12 2×2 matrix determinants per RE are required, and in total, per RB, 12K 2×2 matrix determinants and 6 multiplications are required.

If a 2×2 matrix determinant calculation requires two multiplications, $|R_k(\rho_I, cmi)|$ is calculated directly per RE, $\Sigma_{k=1}^K |R_k(\rho_I, cmi)|$ is calculated, and 90 multiplications per RE and a total of 90K multiplications per RB are required. However, Equation (25) above may be used so that only 24 multiplications per RE and a total of 24K+6 multiplications per RB are required.

According to an embodiment of the present disclosure, a further approximation over ML-GA is applied for serving signal cancellation in the calculation of Equation (18) above where $|R'_k(\rho_I, cmi)| = |\rho_I^2 W_k G_k^I P^{I,J_1,p} (P^{I,J_1,p})^H (G_k^I)^H W_k^H + \sigma'^2 I|$ is calculated for 15 possible hypothesis. Therefore, Equation (26) is as follows:

$$\sum_{k=1}^{K} |R'_k(\rho_I, cmi)| = \tag{26}$$

$$\begin{cases} \rho_I^2 \sigma'^2 \sum_{k=1}^{K} (r'^I_{k,11}(cmi) + r'^I_{k,00}(cmi)) & cmi \in \{0, 1, 2, 3\} \\ \rho_I^4 \sum_{k=1}^{K} |R'^I_k(cmi)| + \\ \rho_I^2 \sigma'^2 \sum_{k=1}^{K} (r'^I_{k,11}(cmi) + r'^I_{k,00}(cmi)) & cmi = 4 \end{cases}$$

From Equation (26) above, calculating $\Sigma_{k=1}^K |R'_k(\rho_I, cmi)|$ only requires one 2×2 matrix determinant per RE, and a total of K 2×2 matrix determinants and 9 multiplications per RB.

If a 2×2 matrix determinant calculation requires two multiplications, $|R'_k(\rho_I, cmi)|$ is calculated directly per RE, $\Sigma_{k=1}^K |R_k(\rho_I, cmi)|$ is calculated, and 90 multiplications per RE and a total of 90K multiplications per RB are required. However, Equation (26) above may be used so that only 2 multiplications per RE and a total of 2K+9 multiplications per RB are required. For serving signal cancellation, whitening over the residual serving signal and noise may be applied.

The GA method and the GA method with further approximation provide better TPR and joint TPR-CMI blind detection performance than a projection method. In addition, the GA method has a performance that is close to that of the GA method with further approximation.

According to an embodiment of the present disclosure, rank 2 precoding identification is provided. If the received signal is rank 2, TPR is known, the serving signal is cancelled, and Equation (27) is as follows:

$$y_k = \rho_I^2 G_k^I P^{I,2,p} x_k + n_k. \tag{27}$$

A minimum mean square error (MMSE) filter $W_k = (\rho_I^4 G_k^{I^H} G_k^I + \sigma^2 I)^{-1} \rho_I^2 G_k^{I^H}$ may be applied to obtain Equation (28) as follows:

$$y'_k = W_k y_k = P^{I,2,p} x_k + n'_k, \tag{28}$$

where $$P^{I,2,0} = \frac{1}{2}\begin{bmatrix} 1 & 1 \\ -1 & 1 \end{bmatrix} \text{ and } P^{I,2,1} = \frac{1}{2}\begin{bmatrix} 1 & 1 \\ j & -j \end{bmatrix}.$$

If $\beta_{k,I} = \text{Re}\{y'_{k,1} y'^*_{k,2}\}$ and $\beta_{k,Q} = \text{Im}\{y'_{k,1} y'^*_{k,2}\}$ are defined, Equations (29) and (30) are obtained as follows:

$$\beta_I = \tag{29}$$
$$\begin{cases} \text{Re}\{(x_{k,1} + x_{k,2})(-x_{k,1} + x_{k,2})^* + Z_k\} = |x_{k,2}|^2 - |x_{k,1}|^2 + Z_{k,I} & p = 0 \\ \text{Re}\{(x_{k,1} + x_{k,2})(jx_{k,1} - jx_{k,2})^* + Z_k\} = -2\text{Im}\{x_{k,1} x^*_{k,2}\} + Z_{k,I} & p = 1 \end{cases}$$

and $$\beta_Q = \tag{30}$$
$$\begin{cases} \text{Im}\{(x_{k,1} + x_{k,2})(-x_{k,1} + x_{k,2})^* + Z_k\} = 2\text{Im}\{x_{k,1} x^*_{k,2}\} + Z_{k,Q} & p = 0 \\ \text{Im}\{(x_{k,1} + x_{k,2})(jx_{k,1} - jx_{k,2})^* + Z_k\} = |x_{k,2}|^2 - |x_{k,1}|^2 + Z_{k,Q} & p = 1 \end{cases}.$$

For both p=0 and p=1, with QAM signaling, $E\{\beta_{k,I}\} = E\{\beta_{k,Q}\} = 0$ Therefore, there is no linear operation over $\beta_{k,I}$ and $\beta_{k,Q}$ which may reveal the rank 2 precoding index. However, for a given p, $\beta_{k,I}$ and $\beta_{k,Q}$ have different distributions. Therefore, with some non-linear operation f(.), with a property that $E\{f(\beta_{k,I})\} \neq E\{f(\beta_{k,Q})\}$, a rank 2 precoding index may be identified based on Equations (31) and (32) as follows:

$$M_I = \frac{1}{K} \sum_{k=1}^{K} f(\beta_{k,I}) \approx E\{f(\beta_{k,I})\} \tag{31}$$

and $$M_Q = \frac{1}{K} \sum_{k=1}^{K} f(\beta_{k,Q}) \approx E\{f(\beta_{k,Q})\}. \tag{32}$$

Table 2 below illustrates a distribution of $|x_2|^2 - |x_1|^2$ and $\text{Im}\{x_1 x_2^*\}$ for QPSK, 16QAM and 64QAM.

TABLE 2

| Modulation order | | Possible Values | Corresponding Probabilities |
|---|---|---|---|
| QPSK | $|x_2|^2 - |x_1|^2$ | 0 | 1 |
| | $\text{Im}\{x_1 x_2^*\}$ | $\{-1, 1\}$ | $\left\{\dfrac{1}{2}, \dfrac{1}{2}\right\}$ |
| 16QAM | $|x_2|^2 - |x_1|^2$ | $\{-1.6, -0.8, 0, 0.8, 1.6\}$ | $\left\{\dfrac{1}{16}, \dfrac{1}{4}, \dfrac{3}{8}, \dfrac{1}{4}, \dfrac{1}{16}\right\}$ |
| | $\text{Im}\{x_1 x_2^*\}$ | $\{-3.6, -2.4, -2, -1.6, -1.2, -0.8, -0.4,$ $0, 0.4, 0.8, 1.2, 1.6, 2, 2.4, 3.6\}$ | $\left\{\dfrac{1}{64}, \dfrac{1}{16}, \dfrac{1}{32}, \dfrac{1}{32}, \dfrac{1}{8}, \dfrac{1}{16}, \dfrac{5}{64},\right.$ $\left.\dfrac{3}{16}, \dfrac{5}{64}, \dfrac{1}{16}, \dfrac{1}{8}, \dfrac{1}{32}, \dfrac{1}{32}, \dfrac{1}{16}, \dfrac{1}{64}\right\}$ |
| 64QAM | $|x_2|^2 - |x_1|^2$ | $\{-2.29, -2.10, -1.91, -1.72, -1.53, -1.34,$ $-1.15, -0.96, -0.77, -0.58, -0.39, -20,$ $0, 0.19, 0.38, 0.57, 0.76, 0.95, 1.14,$ $1.33, 1.52, 1.71, 1.90, 2.09, 2.28\}$ | $\{16, 32, 16, 64, 96, 64,$ $224, 224, 144, 384, 272, 256,$ $512, 256, 272, 384, 144, 244, 224,$ $64, 96, 64, 16, 32, 16\}/4096$ |
| | $\text{Im}\{x_1 x_2^*\}$ | 71 different possibilities for $\text{Im}\{x_1 x_2^*\}$ under 64QAM modulation | |

For the non-linear operation f(.), two different operations $f(\beta_{k,I})=|\beta_{k,I}|$ and $f(\beta_{k,I})=|\beta_{k,I}|^2$ may be used, but the present disclosure is not limited thereto. Other non-linear operations may also be used. Table 3 below illustrates a comparison of $E\{f(|x_2|^2-|x_1|^2)\}$ and $E\{f(\text{Im}\{x_1 x_2^*\})\}$ with $f(a)=|a|$ and $f(a)=|a|^2$ for different modulation orders. Table 3 below shows that these non-linear operations, $E\{f(\beta_{k,I})\} \neq E\{f(\beta_{k,Q})\}$ enable identification of a rank 2 precoding index.

TABLE 3

| Modulation order | | $E\{|\bullet|\}$ | $E\{|\bullet|^2\}$ |
|---|---|---|---|
| QPSK | $|x_2|^2 - |x_1|^2$ | 0 | 0 |
| | $\text{Im}\{x_1 x_2^*\}$ | 1 | 1 |
| 16QAM | $|x_2|^2 - |x_1|^2$ | 0.6 | 0.64 |
| | $\text{Im}\{x_1 x_2^*\}$ | 1.1 | 2 |
| 64QAM | $|x_2|^2 - |x_1|^2$ | 0.694 | 0.7619 |
| | $\text{Im}\{x_1 x_2^*\}$ | 1.1116 | 2 |

Based on the property of the above non-linear functions, the precoding identification rule may be defined as in Equation (33) as follows:

$$\hat{p} = \begin{cases} 0 & M_Q > M_I \\ 1 & M_Q < M_I \end{cases} \quad (33)$$

where $M_I$ and $M_Q$ are given in Equations (31) and (32) above.

Figure 2:
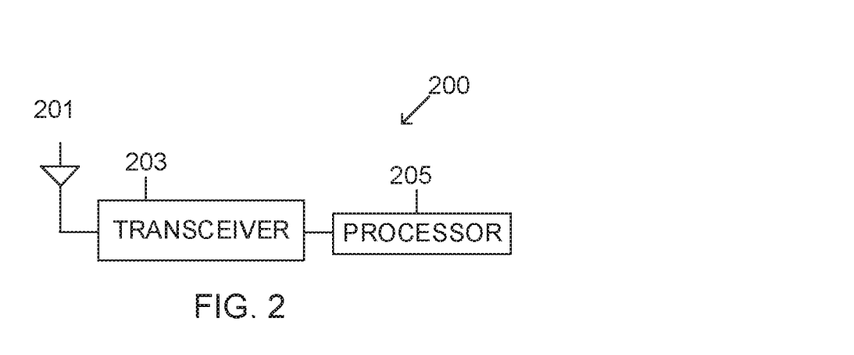
FIG. 2 is a flowchart of a method, according to an embodiment of the present disclosure.

FIG. 2 is a block diagram of an apparatus 200 for blind detection of interference patterns in an LTE system using GA over both interfering and serving signals, according to an embodiment of the present disclosure.

Referring to FIG. 2, the apparatus 200 includes an antenna 201, a transceiver 203, and a processor 205.

The antenna 201 receives a signal, where the signal may include a serving signal, at least one interfering signal, or a combination thereof.

The transceiver 203 includes an input connected to the antenna 201 for receiving the received signal, and an output.

The processor 205 includes an input connected to the output of the transceiver 203 and is configured to cancel a serving signal in the received signal or not. If a serving signal is cancelled from the received signal then a processor 205 is further configured to determine a sampled covariance matrix of the serving-signal-cancelled received signal. If a serving signal is not cancelled from the received signal then the processor is further configured to determine a sampled covariance matrix of the received signal.

The processor 205 is further configured to determine likelihood metrics for hypotheses on interference signal rank, precoding matrix, and power with GA on interfering signals.

The processor 205 is further configured to determine hypotheses that maximize the likelihood metrics.

After determining the hypotheses that maximize likelihood metrics, the processor 205 is further configured to determine whether the received signal or the serving-signal-cancelled received signal is of rank 1.

If the processor 205 determines that the rank of the received signal or the serving-signal-cancelled received signal is rank 1, the processor 205 is further configured to identify a TPR, and detect a rank 1 precoding index based on the above GA.

If the processor 205 determines that the rank of the received signal or the serving-signal-cancelled received signal is not rank 1, the processor 205 is further configured to determine whether transmit diversity is present in the received signal or the serving-signal-cancelled received signal. That is, if transmit diversity is present then SFBC is detected. Otherwise, the rank of the received signal or the serving-signal-cancelled received signal is rank 2. In an embodiment of the present disclosure, a blind SFBC detection method may be applied to differentiate rank 2 from SFBC.

If SFBC is detected, then the processor 205 is further configured to determine a precoding index and power index of interference of the received signal or the serving-signal-cancelled received signal that concerns SFBC. Otherwise, rank 2 is determined.

If rank 2 is determined, then the processor 205 is further configured to determine a precoding index and a power index of interference for the received signal or the serving-signal-cancelled received signal of rank 2.

In an embodiment of the present disclosure, a further approximation over $M_{p_{I^,cmi}}$ is provided (e.g., a further approximation over ML-GA), which reduces hardware complexity.

The approximation as shown in Equation (22) above, which reduces the required number of divisions and logarithm calculations by a factor of K, where K is a number of REs in at least one RB.

Calculation complexity may be reduced further in the calculation of $|R_k(\rho_I, cmi)|$. A lower complexity calculation of $|R_k(\rho_I, cmi)|$ is described in Equation (24) above.

For $cmi \in \{0, 1, 2, 3\}$, $R_k^I(cmi)$ is a rank 1 matrix, then $|R_k^I(cmi)|=0$ for $cmi \in \{0, 1, 2, 3\}$ and only $|R_k^I(cmi)|$ may be determined for cmi=4. Therefore, for $\Sigma_{k=1}^K |R_k(\rho_I, cmi)|$, Equation (25) is as described above.

To calculate $\Sigma_{k=1}^K |R_k(\rho_I, cmi)|$, 12 2×2 matrix determinants per RE are required, and in total, per RB, 12K 2×2 matrix determinants and 6 multiplications are required.

If a 2×2 matrix determinant calculation requires two multiplications, $|R_k(\rho_I, cmi)|$ is calculated directly per RE, $\Sigma_{k=1}^K |R_k(\rho_I, cmi)|$ is calculated, and 90 multiplications per RE and a total of 90K multiplications per RB are required. However, Equation (25) above may be used so that only 24 multiplications per RE and a total of 24K+6 multiplications per RB are required.

According to an embodiment of the present disclosure, a further approximation over ML-GA is applied for serving signal cancellation in the calculation of Equation (18) above where $|R'_k(\rho_I, cmi)|=|\rho_I^2 W_k G_k^I P^{I,l_{I,p}} (P^{I,l_{I,p}})^H (G_k^I)^H W_k^H + \sigma'^2 I|$ is calculated for 15 possible hypothesis. Therefore, Equation (26) is as described above.

From Equation (26) above, calculating $\Sigma_{k=1}^K |R'_k(\rho_I, cmi)|$ only requires one 2×2 matrix determinant per RE, and a total of K 2×2 matrix determinants and 9 multiplications per RB.

If a 2×2 matrix determinant calculation requires two multiplications, $|R'_k(\rho_I, cmi)|$ is calculated directly per RE, $\Sigma_{k=1}^K |R_k(\rho_I, cmi)|$ is calculated, and 90 multiplications per RE and a total of 90K multiplications per RB are required. However, Equation (26) above may be used so that only 2 multiplications per RE and a total of 2K+9 multiplications per RB are required. For serving signal cancellation, whitening over the residual serving signal and noise may be applied.

According to an embodiment of the present disclosure, rank 2 precoding identification is provided. If the received signal is rank 2, TPR is known, the serving signal is cancelled. With some non-linear operation f(.), with a property that $E\{f(\beta_{k,I})\} \neq E\{f(\beta_{k,Q})\}$, a rank 2 precoding index may be identified based on Equations (31) and (32) described above. For the non-linear operation f(.), two different operations $f(\beta_{k,I})=|\beta_{k,I}|$ and $f(\beta_{k,I})=|\beta_{k,I}|^2$ may be used, but the present disclosure is not limited thereto. Other non-linear operations may also be used.

Based on the property of the above non-linear functions, the precoding identification rule may be defined as in Equation (33) described above.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
  receiving a signal including a serving signal and an interference signal;
  applying a Gaussian approximation (GA) on the serving signal and the interference signal;
  determining, jointly, a maximum likelihood (ML) solution of rank, traffic to pilot ratio (TPR), and precoding matrix index on the GA-applied serving signal and the GA-applied interference signal;
  determining, sequentially, a rank of the interference signal based on the jointly determined ML solution;
  determining a covariance matrix of the received signal;
  determining likelihood metrics for hypotheses on the interference signal rank, the precoding matrix index, and power on the GA-applied interference signal;
  determining hypotheses that maximize the likelihood metrics and determine the TPR;
  determining if the rank is 1;
  if the rank is not 1 then determining if transmit diversity is present,
  if the transmit diversity is not present then determining that the rank is 2;
  determining the precoding matrix index if the rank is 1, the transmit diversity is present, or if the rank is 2, and
  returning the determinations of the TPR, the rank, and the precoding matrix index.

2. The method of claim 1, wherein the ML solution of rank, TPR, and precoding matrix index is determined for at least one cell-specific reference signal (CRS) antenna port.

3. The method of claim 2, wherein the likelihood metric is one of:

$$M_{\rho_I} = \sum_{k=1}^{K} \frac{\text{trace}(y_k y_k^H (D_k^S + \sigma^2 I)) + \rho_I^2 \text{trace}(y_k y_k^H D_k^I)}{|R_k(\rho_I)|} + \log(|R_k(\rho_I)|);$$

$$M_{\rho_I} = \frac{\sum_{k=1}^{K} \text{trace}(y_k y_k^H (D_k^S + \sigma^2 I)) + \rho_I^2 \text{trace}(y_k y_k^H D_k^I)}{\sum_{k=1}^{K} \frac{|R_k(\rho_I)|}{K}} + K \log\left(\frac{\sum_{k=1}^{K} |R_k(\rho_I)|}{K}\right)$$

$$M_{\rho_I,cmi} = \sum_{k=1}^{K} \frac{\text{trace}(y_k y_k^H (D_k^S + \sigma^2 I)) + \rho_I^2 \text{trace}(y_k y_k^H D_k^I(cmi))}{|R_k(\rho_I, cmi)|} + \log(|R_k(\rho_I, cmi)|); \text{ or}$$

$$M_{\rho_I,cmi} \approx \frac{\sum_{k=1}^{K} \text{trace}(y_k y_k^H (D_k^S + \sigma^2 I)) + \rho_I^2 \text{trace}(y_k y_k^H D_k^I(cmi))}{\sum_{k=1}^{K} \frac{|R_k(\rho_I, cmi)|}{K}} + K \log\left(\frac{\sum_{k=1}^{K} |R_k(\rho_I, cmi)|}{K}\right),$$

where $M_{\rho_I}$ represents the metric in one CRS antenna port case and $M_{\rho_I^{cmi}}$ represent the metric in two CRS antenna port case, $y_k = H_k^S x_k^S + \rho_I H_k^I x_k^I + n_k$, $H_k^m$ represents an effective channel matrix from a serving evolved node B (eNB) to a user equipment (UE) for m=S and from an interfering cell to the UE for m=I, where $\rho_I$ represents a TPR of an interfering signal, $x_k^m = [x_k^{m,1}, \ldots, x_k^{m,i_m}]^T$ is a $l_m \times 1$ transmit signal vector, $l_m$ indicates a number of transmission layers, $n_k$ is an additive white Gaussian noise (AWGN) vector with covariance $E\{n_k n_k^H\} = \sigma^2 I$, K is a integer, $|R_k(\rho_I)|$ denotes a determinant of matrix $R_k(\rho_I) = R_k^S + \rho_I^2 R_k^I + \sigma^2 I$, $$R_k^S = \begin{bmatrix} r_{k,00}^S & r_{k,01}^S \\ r_{k,10}^S & r_{k,11}^S \end{bmatrix}$$

$$R_k^I = \begin{bmatrix} r_{k,00}^I & r_{k,01}^I \\ r_{k,10}^I & r_{k,11}^I \end{bmatrix}$$

$$D_k^S = \begin{bmatrix} r_{k,11}^S & -r_{k,01}^S \\ -r_{k,10}^S & r_{k,00}^S \end{bmatrix}, \text{ and}$$

$$D_k^I = \begin{bmatrix} r_{k,11}^I & -r_{k,01}^I \\ -r_{k,10}^I & r_{k,00}^I \end{bmatrix},$$

and
$|R_k(\rho_I, \text{cmi})|$ denotes a determinant of matrix $R_k(\rho_I, \text{cmi}) = R_k^S + \rho_I^2 R_k^I(\text{cmi}) + \sigma^2 I$, where $$R_k^I(\text{cmi}) = G_k^I P^{l,l_1,p}(P^{l,l_1,p})^H (G_k^I)^H$$
$$= \begin{bmatrix} r_{k,00}^I(\text{cmi}) & r_{k,01}^I(\text{cmi}) \\ r_{k,10}^I(\text{cmi}) & r_{k,11}^I(\text{cmi}) \end{bmatrix},$$

and $$D_k^I(\text{cmi}) = \begin{bmatrix} r_{k,11}^I(\text{cmi}) & -r_{k,01}^I(\text{cmi}) \\ -r_{k,10}^I(\text{cmi}) & r_{k,00}^I(\text{cmi}) \end{bmatrix},$$

then $R_k^{-1}(\rho_I, \text{cmi})$ is as follows:

$$R_k^{-1}(\rho_I, \text{cmi}) = \frac{D_k^S + \rho_I^2 D_k^I(\text{cmi}) + \sigma^2 I}{|R_k(\rho_I, \text{cmi})|},$$

wherein $\text{cmi} \in \{0,1,2,3,4\}$ with $\text{cmi} = i$ (for $i \in \{0,1,2,3\}$) corresponding to rank 1 with a precoding index of $p=i$, and $\text{cmi}=4$ corresponding to rank 2 and SFBC, and wherein there are 5 possible hypotheses for cmi and 3 possible hypotheses for $\rho_I$.

4. The method of claim 3, wherein the precoding matrix index for the received signal or the serving-signal-cancelled received signal of rank 2 is identified based on $$M_I = \frac{1}{K}\sum_{k=1}^{K} f(\beta_{k,I}) \approx E\{f(\beta_{k,I})\}$$

and $$M_Q = \frac{1}{K}\sum_{k=1}^{K} f(\beta_{k,Q}) \approx E\{f(\beta_{k,Q})\},$$

wherein a non-linear operation $f(.)$ has a property that $E\{f(\beta_{k,I})\} \neq E\{f(\beta_{k,Q})\}$,
wherein the non-linear operation $f(.)$ includes $f(\beta_{k,I}) = |\beta_{k,I}|$ and $f(\beta_{k,I}) = |\beta_{k,I}|^2$, where a precoding identification rule is $$\hat{p} = \begin{cases} 0 & M_Q > M_I \\ 1 & M_Q < M_I \end{cases}.$$

5. The method of claim 4, wherein the covariance matrix is determined on the received signal after the serving signal is cancelled from the received signal.

6. An apparatus, comprising:
an antenna for receiving a signal including a serving signal and an interference signal;
a processor configured to apply a Gaussian approximation (GA) on the serving signal and the interference signal, and determine, jointly, a maximum likelihood (ML) solution of rank, traffic to pilot ratio (TPR), and precoding matrix index on the GA-applied serving signal and the GA-applied interference signal; and, sequentially, a rank of the interference signal based on the jointly determined ML solution,
wherein the processor is further configured to determine a covariance matrix of the received signal, and
wherein the processor is further configured to:
determine likelihood metrics for hypotheses on the interference signal rank, the precoding matrix index, and power on the GA-applied interference signal;
determine hypotheses that maximize the likelihood metrics and determine the TPR;
determine if the rank is 1;
if the rank is not 1 then determine if transmit diversity is present;
if the transmit diversity is not present then determine that the rank is 2;
determine the precoding matrix index if the rank is 1, the transmit diversity is present, or if the rank is 2; and
return the determinations of the TPR, the rank, and the precoding matrix index.

7. The apparatus of claim 6, wherein the processor is further configured to determine the ML solution of rank, TPR, and precoding matrix index for at least one cell-specific reference signal (CRS) antenna port.

8. The apparatus of claim 7, wherein the processor is further configured to determine a likelihood metric selected from one of:

$$M_{\rho_I} = \sum_{k=1}^{K} \frac{\text{trace}(y_k y_k^H (D_k^S + \sigma^2 I)) + \rho_I^2 \text{ trace}(y_k y_k^H D_k^I)}{|R_k(\rho_I)|} + \log(|R_k(\rho_I)|);$$

$$M_{\rho_I} = \frac{\sum_{k=1}^{K} \text{trace}(y_k y_k^H (D_k^S + \sigma^2 I)) + \rho_I^2 \text{ trace}(y_k y_k^H D_k^I)}{\sum_{k=1}^{K} \frac{|R_k(\rho_I)|}{K}} + K\log\left(\frac{\sum_{k=1}^{K} |R_k(\rho_I)|}{K}\right)$$

$$M_{\rho_I,\text{cmi}} = \sum_{k=1}^{K} \frac{\text{trace}(y_k y_k^H (D_k^S + \sigma^2 I)) + \rho_I^2 \text{ trace}(y_k y_k^H D_k^I(\text{cmi}))}{|R_k(\rho_I, \text{cmi})|} +$$

$$\log(|R_k(\rho_I, \text{cmi})|); \text{ or}$$

$$M_{\rho_I,\text{cmi}} \approx \frac{\sum_{k=1}^{K} \text{trace}(y_k y_k^H (D_k^S + \sigma^2 I)) + \rho_I^2 \text{ trace}(y_k y_k^H D_k^I(\text{cmi}))}{\sum_{k=1}^{K} \frac{|R_k(\rho_I, \text{cmi})|}{K}} +$$

$$K\log\left(\frac{\sum_{k=1}^{K} |R_k(\rho_I, \text{cmi})|}{K}\right),$$

where $M_{\rho_I}$ represents the metric in one CRS antenna port case and $M_{\rho_I^{cmi}}$ represent the metric in two CRS antenna port case, $y_k = H_k^S x_k^S + \rho_I H_k^I x_k^I + n_k$, $H_k^m$ represents an effective channel matrix from a serving evolved node B (eNB) to a user equipment (UE) for m=S and from an interfering cell to the UE for m=I, where $\rho_I$ represents a TPR of an interfering signal, $x_k^m = [x_k^{m,1}, \ldots, x_k^{m,l_m}]^T$ is a $l_m \times 1$ transmit signal vector, $l_m$ indicates a number of transmission layers, $n_k$ is an additive white Gaussian noise (AWGN) vector with covariance $E\{n_k n_k^H\} = \sigma^2 I$, K is a integer, $|R_k(\rho_I)|$ denotes a determinant of matrix $R_k(\rho_I) = R_k^S + \rho_I^2 R_k^I + \sigma^2 I$, $$R_k^S = \begin{bmatrix} r_{k,00}^S & r_{k,01}^S \\ r_{k,10}^S & r_{k,11}^S \end{bmatrix}$$

$$R_k^I = \begin{bmatrix} r_{k,00}^I & r_{k,01}^I \\ r_{k,10}^I & r_{k,11}^I \end{bmatrix}$$

$$D_k^S = \begin{bmatrix} r_{k,11}^S & -r_{k,01}^S \\ -r_{k,10}^S & r_{k,00}^S \end{bmatrix}, \text{ and}$$

$$D_k^I = \begin{bmatrix} r_{k,11}^I & -r_{k,01}^I \\ -r_{k,10}^I & r_{k,00}^I \end{bmatrix},$$

and $|R_k(\rho_I, cmi)|$ denotes a determinant of matrix $R_{k(\rho_I, cmi)} = R_k^{S+\rho_I^2} R_k^I(cmi) = \sigma^2 I$, where $$R_k^I(cmi) = G_k^I P^{l,l_I,P} (P^{l,l_I,P})^H (G_k^I)^H$$
$$= \begin{bmatrix} r_{k,00}^I(cmi) & r_{k,01}^I(cmi) \\ r_{k,10}^I(cmi) & r_{k,11}^I(cmi) \end{bmatrix},$$

and $$D_k^I(cmi) = \begin{bmatrix} r_{k,11}^I(cmi) & -r_{k,01}^I(cmi) \\ -r_{k,10}^I(cmi) & r_{k,00}^I(cmi) \end{bmatrix},$$

then $R_k^{-1}(\rho_I, cmi)$ is as follows:

$$R_k^{-1}(\rho_I, cmi) = \frac{D_k^S + \rho_I^2 D_k^I(cmi) + \sigma^2 I}{|R_k(\rho_I, cmi)|},$$

wherein $cmi \in \{0,1,2,3,4\}$, and wherein there are five possible hypotheses for cmi and three possible hypotheses for $\rho_I$.

9. The apparatus of claim 8, wherein the processor is further configured to identify a precoding matrix index for the received signal or the serving-signal-cancelled received signal of rank 2 based on $$M_I = \frac{1}{K} \sum_{k=1}^{K} f(\beta_{k,I}) \approx E\{f(\beta_{k,I})\}$$

$$M_Q = \frac{1}{K} \sum_{k=1}^{K} f(\beta_{k,Q}) \approx E\{f(\beta_{k,Q})\},$$

wherein a non-linear operation f (.) has a property that $E\{f(\beta_{k,I})\} \neq E\{f(\beta_{k,Q})\}$,
wherein the non-linear operation f(.) includes $f(\beta_{k,I}) = |\beta_{k,I}|$ and $f(\beta_{k,I}) = |\beta_{k,I}|^-$, where a precoding identification rule is $$\hat{p} = \begin{cases} 0 & M_Q > M_I \\ 1 & M_Q < M_I \end{cases}.$$

10. The apparatus of claim 9, wherein the processor is further configured to determine a covariance matrix on the received signal after the serving signal is cancelled from the received signal.

* * * * *